(12) United States Patent
Chen et al.

(10) Patent No.: US 11,853,642 B2
(45) Date of Patent: Dec. 26, 2023

(54) METHOD AND SYSTEM FOR ADAPTIVE VOLUME CONTROL

(71) Applicant: Apple Inc., Cupertino, CA (US)

(72) Inventors: Tyrone T. Chen, San Jose, CA (US); Joseph M. Williams, Morgan Hill, CA (US); Juan C. Martinez Nieto, Cupertino, CA (US); Tony S. Verma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/227,233

(22) Filed: Apr. 9, 2021

(65) Prior Publication Data

US 2021/0349681 A1    Nov. 11, 2021

Related U.S. Application Data

(60) Provisional application No. 63/023,114, filed on May 11, 2020.

(51) Int. Cl.
*G06F 3/16* (2006.01)
*H04R 1/10* (2006.01)

(52) U.S. Cl.
CPC .............. *G06F 3/165* (2013.01); *G06F 3/162* (2013.01); *H04R 1/1041* (2013.01); *H04R 2420/07* (2013.01); *H04R 2430/01* (2013.01)

(58) Field of Classification Search
CPC ....... G06F 3/165; G06F 3/162; H04R 1/1041; H04R 2420/07; H04R 2430/01
See application file for complete search history.

(56) References Cited

U.S. PATENT DOCUMENTS

| | | | | |
|---|---|---|---|---|
| 2007/0274531 | A1* | 11/2007 | Camp | H04R 5/04 381/74 |
| 2009/0245537 | A1* | 10/2009 | Morin | H04R 1/1041 381/107 |
| 2009/0315708 | A1* | 12/2009 | Walley | H03G 7/08 381/107 |
| 2010/0027807 | A1* | 2/2010 | Jeon | H04R 25/453 381/74 |
| 2017/0077887 | A1* | 3/2017 | You | H04R 3/04 |
| 2019/0154497 | A1* | 5/2019 | Goldstein | G01H 3/14 |

* cited by examiner

*Primary Examiner* — Joseph Saunders, Jr.
(74) *Attorney, Agent, or Firm* — Aikin & Gallant, LLP (57) ABSTRACT

A method performed by an audio source device. The method obtains an input audio signal and determines a sound output level of a headset based on the input audio signal, a user volume setting, and a sound output sensitivity of the headset. The method determines whether the sound output level is above a threshold. In response to determining that the sound output level is above the threshold, a scalar gain is applied upon the input audio signal to produce an output audio signal for output by the headset.

20 Claims, 5 Drawing Sheets

METHOD AND SYSTEM FOR ADAPTIVE VOLUME CONTROL

CROSS-REFERENCE TO RELATED APPLICATION

This application claims the benefit of and priority of U.S. Provisional Patent Application Ser. No. 63/023,114, filed May 11, 2020, which is hereby incorporated by this reference in its entirety.

FIELD

An aspect of the disclosure relates to an audio system that adaptively adjusts volume control based on an estimated sound output level of a speaker of an audio system. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio source device, such as a multimedia device that is communicatively coupled to a headset. The device obtains an input audio signal, which may contain user-desired audio content such as music. The device determines a sound output level of the headset (e.g., an output A-weighted sound pressure level (SPL) of a speaker of the audio output device) based on the input audio signal, a user volume setting, and a sound output sensitivity of the headset. The device determines whether the sound output level is above a threshold. If so, the device applies a (first) scalar gain upon the input audio signal to produce an output audio signal for output by the headset.

In one aspect, the user volume setting may be a "software" user volume setting in a software application (e.g., a media player software application) that is being executed by the multimedia device, and the device may apply a (second) scalar gain according to the software user volume setting upon the input audio signal to produce a gain-adjusted input audio signal, from which the sound output level is based on. In another aspect, the first scalar gain may be applied upon the gain-adjusted input audio signal to produce the output audio signal. In some aspects, the device may determine the first scalar gain to be applied to the gain-adjusted audio signal based on the sound output level and the threshold. For instance, the first scalar gain may reduce the gain-adjusted audio signal based on a difference between the sound output level and the threshold.

In one aspect, the sound output sensitivity is a predefined sensitivity that is associated with the headset. In another aspect, the sound output sensitivity is a default sensitivity (e.g., which may be associated with several headsets). In some aspects, in response to determining that the sound output level is above the threshold, the device outputs a notification indicating that a volume of sound output has been reduced.

In another aspect, in response to determining that the headset is a powered headset (e.g., a device which draws power from an external or internal power source in order to power one or more components, such as an amplifier integrated therein), the device may perform one or more different operations. For example, the device may obtain the user volume setting as a "hardware" user volume setting of the powered headset, where the sound output level of the headset is determined based on the input audio signal, the hardware user volume setting, and the sound output sensitivity of the powered headset. A hardware volume setting may be a volume setting for one or more hardware components (e.g., the amplifier) of the powered headset. In one aspect, the device may transmit the input audio signal and the (first) scalar gain (which may be determined based on the sound output level as described above) to the audio output device such that the audio output device applies the scalar gain to the input audios signal to produce an output audio signal for output by the audio output device.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Acoustic dosimetry is the process of measuring noise exposure over a period of time (e.g., an hour, a day, a week, a month, etc.) in order to provide a cumulative noise exposure reading (e.g., a sound pressure level (SPL) value). Normally, this may involve an electronic device (e.g., a SPL meter) measuring ambient noises (e.g., captured using a microphone) within a close proximity to a listener, and outputting a SPL reading (e.g., displaying the reading on a display screen of the SPL meter).

Extended periods of exposure to loud sounds have been shown to cause hearing loss (e.g., noise-induced hearing loss (NIHL)). NIHL is attributed to damage to microscopic hair cells inside the inner ear due to loud sound exposure. For instance, extended exposure to sounds at or above 85 dB may cause temporary or permanent hearing loss in one or both ears. Therefore, some organizations (e.g., the National Institute for Occupational Safety and Health (NIOSH)) have recommended that worker exposure to ambient noise be controlled below a level equivalent to 85 dB for eight hours to minimize occupational NIHL.

Audio output devices, such as electronic headsets have become increasingly popular with users, because they reproduce media such as music, podcasts, and movie sound tracks with high fidelity while at the same time not disturbing others who are nearby. Recently, the World Health Organization (WHO) has released hearing health and safety standards that limit the maximum sound output of a headset to 85 dB. In order to satisfy this standard, an acoustic dosimetry process (e.g., that is executed within the headset or another electronic device that is paired with the headset) may monitor an in-ear SPL at the headset, and notify (or alert) a user when the sound exceeds that threshold. Specifically, the acoustic dosimetry process measures in-ear SPL, e.g., at or near an eardrum reference point, during sound playback. In one aspect, the in-ear SPL is measured as follows. The signal from an internal microphone of the headset, which picks up all sounds in the ear canal, may be processed into an equivalent SPL, using for example laboratory calibration results that include correction factors, e.g., equalization, to be applied to the microphone signal. These correction factors may account for an occlusion effect in which the headsets at least partially occlude the user's ear canal. The in-ear SPL may be determined during playback through the headset that is worn by the user. Once estimated, the in-ear SPL is converted into a sound sample having units defined by the hearing health and safety standards, as described herein. These sound samples may then be used by the dosimetry process to track headset sound exposures. As described herein, to measure the in-ear SPL, the microphone signal obtained from the internal microphone is processed. The use of a microphone and the processing of the signal may require significant processing resources (e.g., of one or more processors) and additional power (e.g., drawn from a limited battery storage).

To overcome these deficiencies, the present disclosure describes an audio system that is capable of adapting volume control for a dosimetry process based on an estimated sound output level of the headset. Specifically, the audio system obtains an input audio signal that may contain user-desired content, such as music. The system determines a sound output level of the headset (e.g., a SPL value) based on the input audio signal, a user volume setting of the audio system, and a sound output sensitivity of the headset. The system determines whether the sound output level is above a threshold. For instance, the threshold may be 85 dB, as specified by WHO, or the threshold may be a user-defined threshold. In response to determining that the sound output level is above the threshold, the system applies a scalar gain upon the input audio signal to produce an output audio signal. For instance, the application of the scalar gain may reduce the level of the input audio signal thereby reducing loud sounds when used to drive a speaker. Thus, the audio system is able adaptively control the volume (and therefore a sound output level) of the headset by estimating the sound output level without the need of processing an internal microphone signal.

Figure 1:
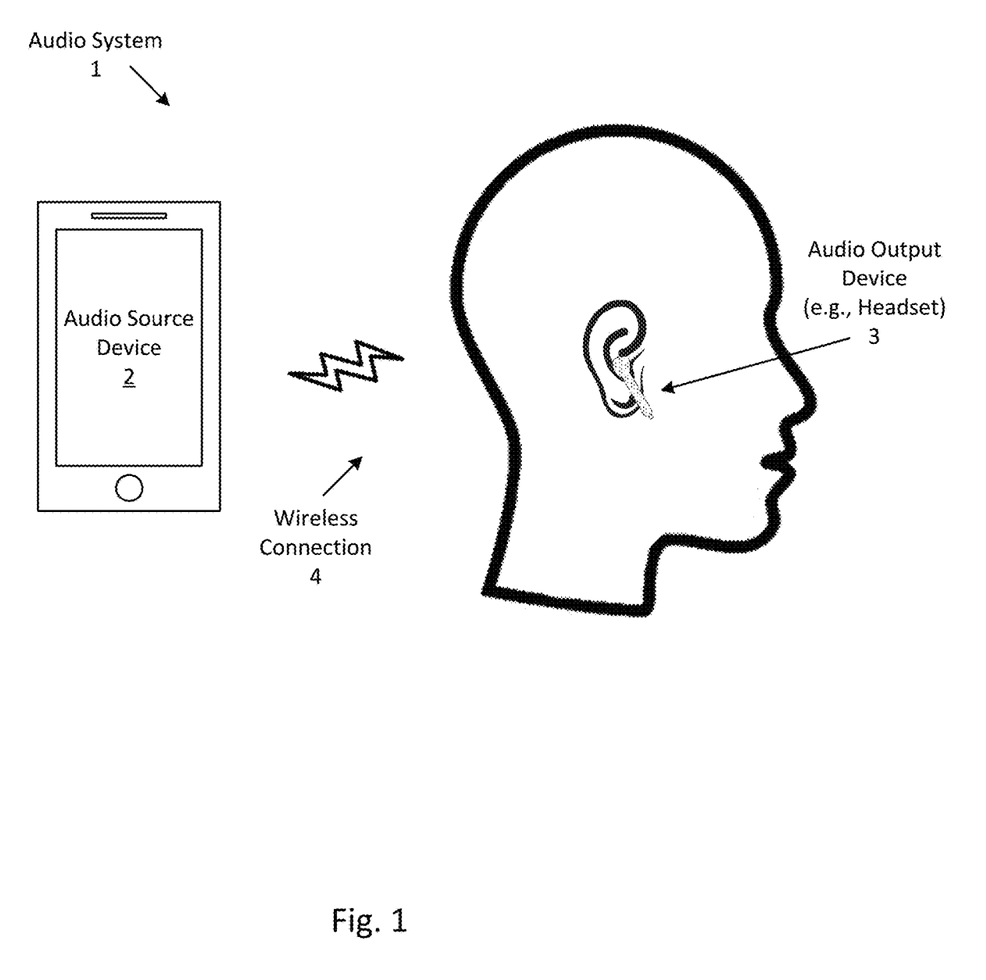
FIG. 1 shows an audio system that includes an audio source device and an audio output device.

FIG. 1 shows an audio system 1 that includes an audio source device 2 and an audio output device 3. In one aspect, the audio system may include other devices, such as a remote electronic server (not shown) that may be communicatively coupled to either the audio source device, the audio output device, or both, and may be configured to perform one or more operations as described herein. As illustrated, the audio output device is a headset that is arranged to direct sound into the ears of the wearer. Specifically, the headset is an earphone (or in-ear headphone or earbud) that is positioned on (or in) the user's right ear. In one aspect, the headset may include a pair of earphones, a left earphone for the user's left ear and a right earphone for the user's right ear. In this case, each earphone may be configured to output at least one audio channel of a program audio (e.g., the right earphone outputting a right audio channel and the left earphone outputting a left audio channel of a two-channel input of a stereophonic recording, such as a musical work). In some aspects, the earphone may be a sealing type that has a flexible ear tip that serves to acoustically seal off the entrance of the user's ear canal from an ambient environment by blocking or occluding in the ear canal. In another aspect, the headset may be over-the-ear headphones that at least partially covers the user's ears. In some aspects, the headset may be on-ear headphones. In another aspect, the output device may be any electronic device that includes at least one speaker and is arranged to be worn by the user and arranged to output sound by driving the speaker with an audio signal.

The audio source device 2 is illustrated as a multimedia device, more specifically a smart phone. In one aspect, the audio source device may be any electronic device that can perform audio signal processing operations and/or networking operations. An example of such a device may include a tablet computer, a laptop, a desktop computer, a smart speaker, etc. In one aspect, the source device may be a portable device, such as a smart phone as illustrated in this figure. In another aspect, the source device may be a head-mounted device, such as smart glasses, or a wearable device, such as a smart watch.

As shown, the audio source device 2 is communicatively coupled to the audio output device, via a wireless connection 4. For instance, the source device may be configured to establish the wireless connection with the audio output device 3 via a wireless communication protocol (e.g., BLUETOOTH protocol or any other wireless communication protocol). During the established wireless connection, the audio source device may exchange (e.g., transmit and receive) data packets (e.g., Internet Protocol (IP) packets) with the audio output device, which may include audio digital data.

In another aspect, the audio source device 2 may communicatively couple with the audio output device via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the audio source device may be configured to drive one or more speakers of the audio output device with one or more audio signals, via the wired connection.

In some aspects, the audio source device 2 may be a part (or integrated with) the audio output device. For example, as described herein, at least some of the components of the audio source device (such as a controller) may be a part of the audio output device. In this case, each of the devices may be communicatively coupled via traces that are a part of one or more printed circuit boards (PCBs) within the audio output device.

In one embodiment, the audio output device 3 may be any electronic device that is arranged to output sound into the ambient environment. As described herein, the device may be worn by (e.g., on a head of) the user. Other examples may include the output device being part of at least one of a stand-alone speaker, a smart speaker, a home theater system, or an infotainment system that is integrated within a vehicle.

Figure 2:
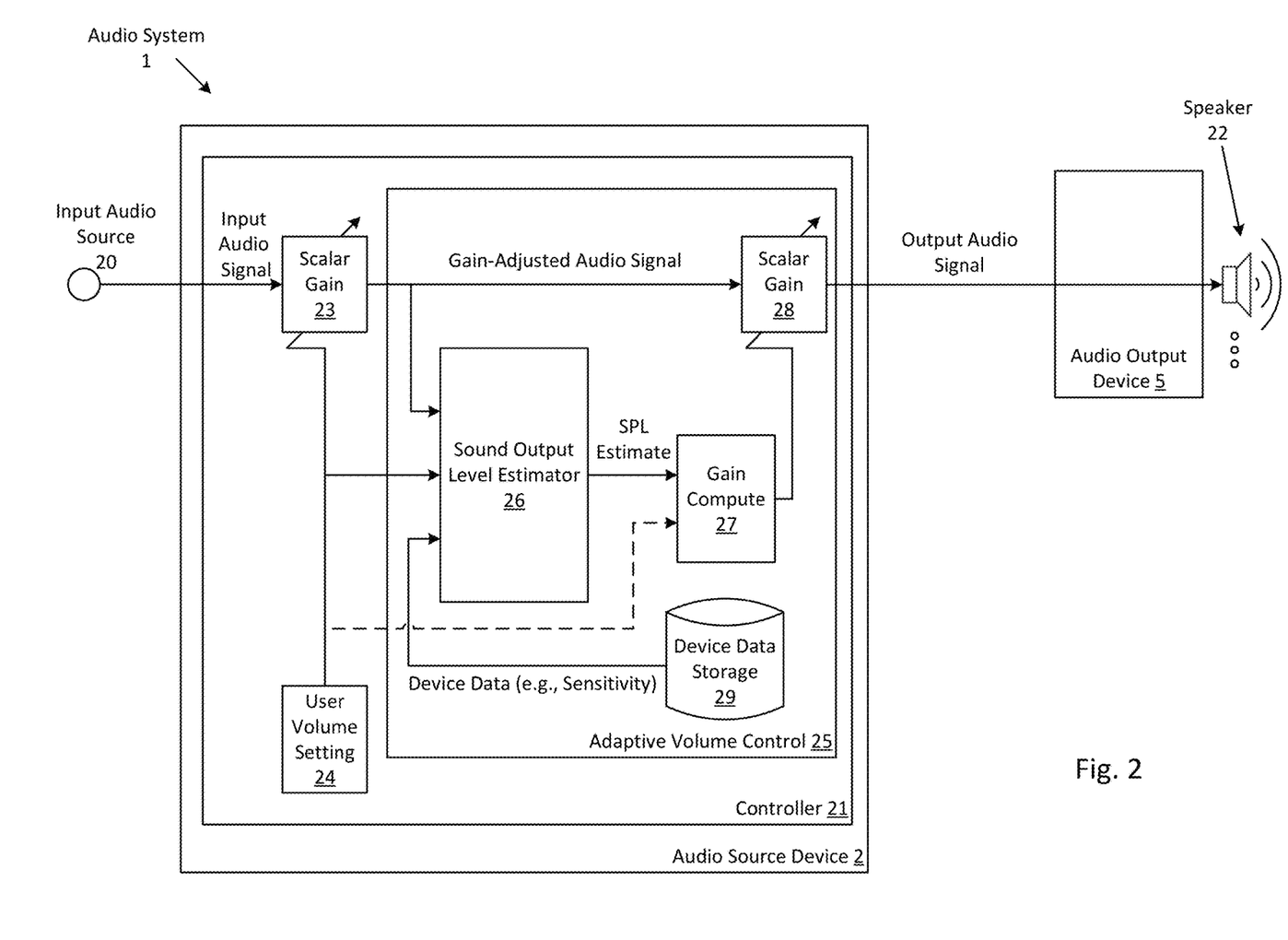
FIG. 2 shows a block diagram of the audio system that performs adaptive volume control according to one aspect.

FIG. 2 shows a block diagram of the audio system 1 that performs adaptive volume control according to one aspect. Specifically, the system 1 includes the audio source device 2 with at least one controller 21, an audio output device 5, and an input audio source 20. In one embodiment, the system may include one or more devices, such as two or more audio output devices.

The audio output device 5 includes at least one speaker 22. For instance, as described herein, the audio output device may be a headset (e.g., on-ear, in-ear, or over-the-ear headphones) with at least two speakers (one left speaker arranged to output sound into a user's left ear and a right speaker arranged to output sound into a user's right ear). In one aspect, the output device 5 may be the same or similar to output device 3 of FIG. 1.

In one aspect, the speaker 22 may be an electrodynamic driver that may be specifically designed for sound output at certain frequency bands, such as a woofer, tweeter, or midrange driver, for example. In one aspect, the speaker may be a "full-range" (or "full-band") electrodynamic driver that reproduces as much of an audible frequency range as possible.

In one aspect, the audio output device 5 may be a "passive" or "non-powered" device that does not draw power from an external source (e.g., the AC mains) or an internal source (e.g., a battery storage integrated therein) to power an audio amplifier for driving speaker 22. For example, the audio output device may be wired earphones (e.g., earbuds) or headphones (e.g., on-ear headphones), which when communicatively coupled (via a wire connection) to the audio source device 2, draws power from the source device to drive the speaker 22. In particular, when (e.g., a media player software program executing within) the audio source device plays back an audio signal (containing audio content, such as music), the signal may be passed through an amplifier circuit (not shown) of the audio source device to amplify the signal. The amplified signal is then transmitted (via a wired connection) to the audio output device to drive speakers contained therein. In one aspect, the audio output device may not contain an audio amplifier.

The input audio source 20 may include a programmed processor that is running a media player software application and may include a decoder that is producing an input audio signal as digital audio input to the (e.g., controller 21 of the) audio source device 2. In one aspect, the programmed processor may be a part of the audio source device 2, such that the media player is executed within the device. In another aspect, the media player may be executed by (e.g., one or more programmed processors of) another electronic device. In this case, the electronic device executing the media player may (e.g., wirelessly) transmit the input audio signal to the audio source device. In some aspects, the decoder may be capable of decoding an encoded audio signal, which has been encoded using any suitable audio codec, such as, e.g., Advanced Audio Coding (AAC), MPEG Audio Layer II, MPEG Audio Layer III, or Free Lossless Audio Codec (FLAC). Alternatively, the input audio source 20 may include a codec that is converting an analog or optical audio signal, from a line input, for example, into digital form for the controller. Alternatively, there may be more than one input audio channel, such as a two-channel input, namely left and right channels of a stereophonic recording of a musical work, or there may be more than two input audio channels, such as for example the entire audio soundtrack in 5.1-surround format of a motion picture film or movie. In one aspect, the input source 20 may provide a digital input or an analog input.

The controller 21 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller may be configured to perform acoustic dosimetry process operations and adaptive volume control. For instance, the controller may be configured to apply a gain to reduce a sound level of an input audio signal to produce an output audio signal (having a reduced sound level than the input audio signal) in response to determining that an estimated SPL of the speaker 22 is at (or above) a threshold level. In one aspect, when the output audio signal is used to drive the speaker, the output sound level of the speaker may be at or below the threshold. More about the operations performed by the controller 21 is described herein. In one aspect, operations performed by the controller 21 may be implemented in software (e.g., as instructions stored in memory of the audio source device 2 and executed by the controller) and/or may be implemented by hardware logic structures as described herein.

In one aspect, the controller 21 may perform one or more other operations, such as audio signal processing operations. For instance, the controller 21 may be configured to perform equalization operations upon (e.g., spectrally shaping) an audio signal.

In one aspect, the audio source device 2 may include more or less components. For example, the source device may include a display screen (e.g., as illustrated in FIG. 1) that is configured to present digital images or videos. As another example, the source device may include one or more microphones that are arranged to convert acoustical energy caused by sound waves propagating in an acoustic environment into a microphone signal. In another aspect, the audio source device may include a network interface that is configured to establish a communication link with another electronic device. For instance, the interface may be configured to establish a wireless connection using any wireless communication method (e.g., BLUETOOTH protocol, a wireless local network link, etc.) with one or more other devices to exchange (e.g., audio) data.

As illustrated, the controller 21 may have one or more operational blocks, which may include a (second) scalar gain 23, a user volume setting 24, and an adaptive volume control 25. The user volume setting may be, for example, a volume setting (or level) value that represents a (user-defined) sound output level of the audio system. For instance, a higher volume setting may correspond to a higher sound output level that is desired by the user for audio playback of (e.g., the speaker 22 of) the system (e.g., while playing back music). In one aspect, the user volume setting may be a value within a range of values, such as a number between zero to ten, or a percentage value. In another aspect, the volume setting may be in decibels (dB). In some aspects, the user volume setting may be user-defined via one or more volume controls (not shown). For instance, the volume setting may correspond to a slider position of a user interface (UI) volume slider control that is displayed on a display screen of the audio system (e.g., a display screen of the audio source device 2). In another aspect, the volume control may be one or more physical buttons that are a part of the audio source device.

In one aspect, the scalar gain 23 is configured to apply a scalar gain (or gain value) upon (at least a portion of) the input audio signal to adjust (e.g., reduce or increase) a level (or magnitude) of the input audio signal thereby producing a gain-adjusted audio signal. In one aspect, the scalar gain 23 may be configured to apply the gain to the signal in the analog domain (e.g., when the signal is an analog signal). In another aspect, the scalar gain 23 may be configured to apply the gain in the digital domain (e.g., when the signal is a digital audio signal). In one aspect, the scalar gain 23 may adjust certain portions of the input audio signal, such as certain frequencies. In another aspect, the scalar gain 23 may apply one or more gain values upon portions of the input audio signal by performing audio compression operations, such as Dynamic Range Compression (DRC).

In one aspect, the user volume setting 24 defines the (e.g., the gain value applied by the) scalar gain 23 based on the volume setting. For example, the higher the user volume setting (e.g., 90% of 0% to 100%), the higher the gain value that may be applied by the scalar gain 23 to the input audio signal to increase the sound output level of the speaker 22 when the signal is used to drive the speaker. Similarly, the lower the user volume setting may result in a lower gain value being applied by the scalar gain, thereby reducing the sound output level of the speaker 22. In one aspect, the scalar gain 23 may determine a gain value to be applied to the input audio signal based on the user volume setting. For instance, the scalar gain may perform a table lookup using the user volume setting into a data structure that associates gain values with user volume settings. In another aspect, the scalar gain may use the user volume setting to determine the gain value (e.g., by applying the user volume setting into a predefined function or algorithm).

In one aspect, the user volume setting 24 may be a "software" user volume setting in a software application, such as the media player software application that is being executed by the controller 21 of the audio source device. In particular, the software volume setting may be a setting in which the software application modifies (or adjusts) an input audio signal (at the scalar gain 23) according to the volume setting. For example, in response to determining the software user volume setting (e.g., based on a user of the audio source device setting a slider position of the UI volume control), the software application being executed by the controller performs audio signal processing operations (e.g., operations performed by scalar gain 23 to apply a gain) upon the input audio signal to adjust (increase and/or decrease) at least some spectral portions of the signal to produce the gain-adjusted audio signal.

The adaptive volume control 25 is configured to adjust volume control of the audio source device 2 based on an estimated sound output level of the speaker 22 of the audio output device 5. For instance, the adaptive volume control may provide that the sound output level of the speaker does not exceed a (e.g., user-defined) threshold. This ensures that the user (or listener) of the audio system is not exposed to excessive sound levels which may result in temporary or permanent hearing loss. The control includes a sound output level estimator 26, a gain compute 27, a (first) scalar gain 28, and device data storage 29.

In one aspect, the device data storage 29 may include data associated with one or more devices as a data structure that is stored (e.g., within memory) in the audio source device 2. Specifically, the storage 29 may include data of components of the devices, such as one or more speakers of one or more audio output devices. For example, the storage may include at least one of a (predefined) sound output sensitivity (in dB), impedance (in Ohms), power handling (in watts), and the frequency response of one or more speakers (e.g., speaker 22) of the audio output device.

In one aspect, the audio source device 2 may obtain the device data from a remote location. For instance, the audio source device 2 may obtain device data (associated with one or more devices) from a remote server (over the Internet). As another example, the source device may obtain at least some of the data from the audio output device 5. For example, once the audio output device 5 is paired with the source device (e.g., when the output device is communicatively coupled), the audio output device may transmit (e.g., in response to a request from the audio source device) the data to the source device. In another aspect, the audio output device may transmit a unique identifier that uniquely identifies the audio output device to the audio source device, which uses the identifier to obtain the device data (e.g., via a table lookup into the device data storage, which may associate unique identifiers with device data). As described herein, the device data may be obtained to perform adaptive volume control operations.

The sound output level estimator 26 is configured to estimate (or determine) a sound output level (e.g., SPL value) of the audio output device based on an input audio signal, a user volume setting of the audio system 1, and device data (e.g., a sound output sensitivity) of the audio output device 5. Specifically, the estimator 26 obtains 1) the user volume setting 24, 2) the gain-adjusted audio signal produced by the scalar gain 23, and 3) device data of the audio output device from the device data storage 29. In one aspect, the estimator 26 may obtain the device data, as described herein. For instance, the estimator may obtain a unique identifier from the audio output device, and perform a table lookup into the device data storage. In some aspects, if the estimator 26 is unable to obtain identification (or device data) from the audio output device, the estimator may retrieve default device data from the device data storage 29.

In one aspect, to estimate the sound output level, the estimator 26 may apply the (gain-adjusted) input audio signal, the user volume setting, and the device data to a sound output level model (e.g., stored in memory) to estimate the sound output level. For instance, the output of the model may represent the estimated sound level at the speaker 22, if the speaker were to output the gain-adjusted input audio signal. In one aspect, the sound output level is an output A-weighted SPL estimate of the speaker 22.

The gain compute 27 is configured to obtain the SPL estimate and is configured to adapt the volume setting based on the SPL estimate. Specifically, the gain control is configured to determine a scalar gain to be applied to the input audio signal based on the SPL estimate. In one aspect, the gain control may be configured to determine whether the SPL estimate is above a threshold. In one aspect, the threshold may be user-defined. For instance, a user of the (audio source device 2 of the) audio system 1 may define the threshold in user settings (e.g., parental controls) via a user interface displayed on a display screen of the source device. In another aspect, the threshold may be predefined by the manufacturer of the source device, or by a third party (e.g., based on WHO hearing health and safety standards, as described herein). If the SPL estimate is above the threshold, the gain compute 27 is configured to adjust (or adapt) volume control by determining a scalar gain to be applied to the input audio signal. In one aspect, the gain compute 27 may determine the scalar gain based on a difference between the SPL estimate and the threshold. For instance, when the SPL estimate is 10% higher than the threshold, the gain control may determine a scalar gain that would proportionally reduce the input audio signal (or rather the gain-adjusted audio signal). In another aspect, the gain compute may perform a table lookup into a data structure (stored within memory of the audio source device) that indicates gain values (e.g., level reductions) based on differences between SPL estimates and thresholds.

The (first) scalar gain 28 is configured to adjust a signal level of the gain-adjusted audio signal (e.g., by applying a gain value) to produce an output audio signal, which when used to drive the speaker 22 will have a sound output level that is at (or less than) the threshold used by the gain compute 27. Specifically, scalar gain 28 obtains the gain-adjusted audio signal (from scalar gain 23) and obtains the gain value determined by the gain compute 27, and applies the gain value to the gain-adjusted audio signal. In one aspect, the scalar gain 28 may perform similar operations as scalar gain 23. For instance, scalar gain 28 may apply audio compression operations, such as DRC, based on the gain value determined and obtained by the gain compute 27. In another aspect, the scaler gain 28 may apply a gain value to reduce the level of (at least a portion of) the gain-adjusted audio signal thereby producing the output audio signal, which when used to drive the speaker 22 has a lower sound output level than the input audio signal (and/or the gain-adjusted audio signal).

In one aspect, the gain compute 27 may optionally obtain the user volume setting 24, and use the setting to enhance the adaptation of the volume control. Specifically, the gain compute 27 may adjust the setting 24 according to the determined scalar gain (and/or according to the difference between the SPL estimate and the threshold). As a result, the system may adapt the volume setting by reducing the setting that may be displayed (e.g., on a display screen of the audio source device 2) to the user, for example.

Figure 3:
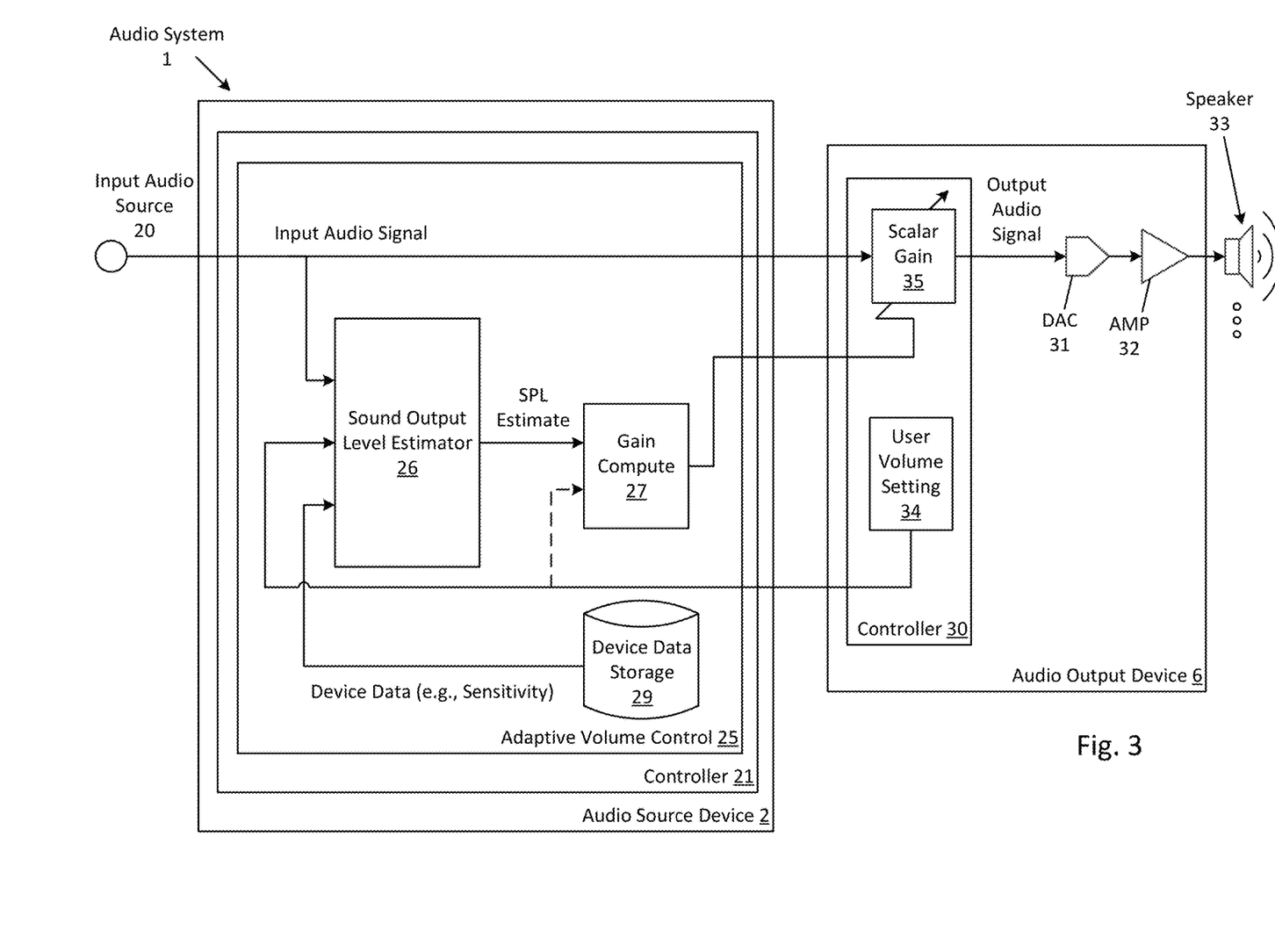
FIG. 3 shows a block diagram of an audio system that performs adaptive volume control according to another aspect.

FIG. 3 shows a block diagram of the audio system 1 that performs adaptive volume control according to another aspect. The audio system includes the input audio source 20, the audio source device 2, and an audio output device 6. The audio output device 6 includes a controller 30, a digital-to-analog converter (DAC) 31, an audio amplifier (AMP) 32, and a speaker 33. In one aspect, the output device may include more components. For instance, the device 6 may include several speakers, such as a left speaker and a right speaker when the device is a headset. In this example, the signal path for each speaker may include at least one DAC and at least one AMP.

The DAC 31 is arranged to receive an (e.g., output) audio signal as an output digital audio signal that may be produced by the controller 30 (and/or obtained from the audio source device 2 as a digital audio signal), and is to convert it into an analog signal. The AMP 32 is arranged to obtain the analog signal from the DAC, and is to provide a driver signal to the speaker 33. In one aspect, the AMP is to amplify the analog signal (e.g., to a level that is high enough to drive the speaker 33). Although the DAC and AMP are shown as separate blocks, in one aspect the electrical circuit components for these may be combined in order to provide for a more efficient digital-to-analog conversion and amplification operation of the driving signal, e.g., using class D amplifier technology.

In one aspect, the audio output device 6 may be an "active" or "powered" device, which draws power from an (external and/or internal) power source to power at least some of its components. For instance, the audio output device may be wired or wireless headphones, which when paired with (e.g., communicatively coupled via a wire and/or wireless connection) to the audio source device 2, draws power an internal source (e.g., a battery storage) to power the AMP 32 for driving the speaker 33. An example of such an audio output device may be a pair of wireless earphones that may pair with the audio source device via any wireless protocol, such as BLUETOOTH protocol, as illustrated in FIG. 1.

As illustrated, the controller 30 may have one or more operational blocks, which may include a user volume setting 34 and a scalar gain 35. In one aspect, the controller 30 may include at least some (other) operational blocks of controller 21, such as a device data storage that stores device data of the audio output device 6. The user volume setting 34 may be, for example, a volume setting (level) value that represents a (user-defined) sound output level of the audio system. In one aspect, user volume setting 34 may be user-defined via one or more volume controls, such as one or more physical volume controls that are a part of audio output device 6. In one aspect, the user volume setting 34 may be a "hardware" user volume setting for hardware components (e.g., the DAC 31 or AMP 32) of the output device 6.

The scalar gain 35 may perform similar operations as scalar gain 23 (and/or gain 28). In particular, scalar gain 35 is for obtaining an input audio signal (e.g., via a wired or wireless connection) from the audio source device (or directly from the input audio source 20), and is for applying a gain value to produce an output audio signal.

In one aspect, the controller 30 may perform one or more additional audio signal processing operations. For example, the controller may be configured to perform active noise cancellation (ANC) operations. In some aspects, the audio output device 6 may include one or more microphones (e.g., a differential pressure gradient micro-electro-mechanical system (MEMS) microphone) that are configured to convert acoustical energy caused by sound waves propagating in an acoustic environment into microphone signals. The controller may obtain one or more microphone signals and perform ANC operations to produce anti-noise for output through the speaker 33 in order to reduce ambient noise from the environment. In another aspect, the controller may perform ambient sound enhancement (ASE) operations in which sound played back by the output device is a reproduction of ambient sound that is captured by the device's one or more microphones. Thus, when the output device is a headset, the device may operate in a "transparent" manner, e.g., as if the headset was not being worn by the user. To perform ASE operations, the controller may process one or more microphone signals with one or more ASE filters, which reduces acoustic occlusion due to the headset being worn over (on or in) the user's ear(s).

As described herein, FIG. 3 illustrates audio system 1 that is configured to perform another aspect of adaptive volume control. In particular, this figure illustrates at least some of the operational blocks shown in FIG. 2 performing similar and/or different operations, and additional operational blocks. For example, in FIG. 3 the sound output level estimator 26 is configured to estimate a sound output level of the audio output device based on an input audio signal, the (hardware) user volume setting 34, and device data 29. In one aspect, the estimator obtains the user volume setting from the audio output device 6 for example via a wireless connection (e.g., as a data packet that is wirelessly transmitted by the output device 6 and received by the source device 2). In another aspect, the estimator obtains the input audio signal from the input audio source 20. In other words, the obtained input audio signal may be unmodified by the controller 21 (e.g., without having performed audio processing operations, such as applying a scalar gain). The gain compute 27 is configured to obtain the SPL estimate (and optionally the user volume setting 34) and is configured to adapt (adjust) the volume control (or setting) by determining a gain value to be applied to the input audio signal based on the SPL estimate, as described herein.

In one aspect, the audio output device 6 is configured to perform audio signal processing operations upon the input audio signal in order to adaptively control the volume of the system. Specifically, the audio output device 6 is configured to perform at least some of the operations that were performed by the audio source device 2 in the description of FIG. 2, to reduce the sound output level of the output device's speaker (e.g., speaker 33). For example, controller 30 includes the scalar gain 35 that is configured to obtain the input audio signal and the gain value (determined by gain compute 27) from the audio source device (e.g., via a wired or wireless connection), and is configured to apply the gain value upon the obtained input audio signal to produce an output audio signal for output by the output device. The scalar gain may reduce a signal level of at least a portion of the input audio signal by the gain value to produce the output audio signal, as described herein. In one aspect, the audio output device may obtain the input audio signal from the input audio source 20.

In another aspect, the audio output device 6 may be configured to perform audio signal processing operations to adaptively control the volume, as described herein. In particular, the (controller 30 of the) audio output device may perform all of the operations of the audio source device 2. In this case, the controller of the audio output device may be configured to obtain the input audio signal from the input audio source 20 (which may be a part of the audio output device), and perform the operations described herein (e.g., the operations of FIGS. 2-4).

Figure 4:
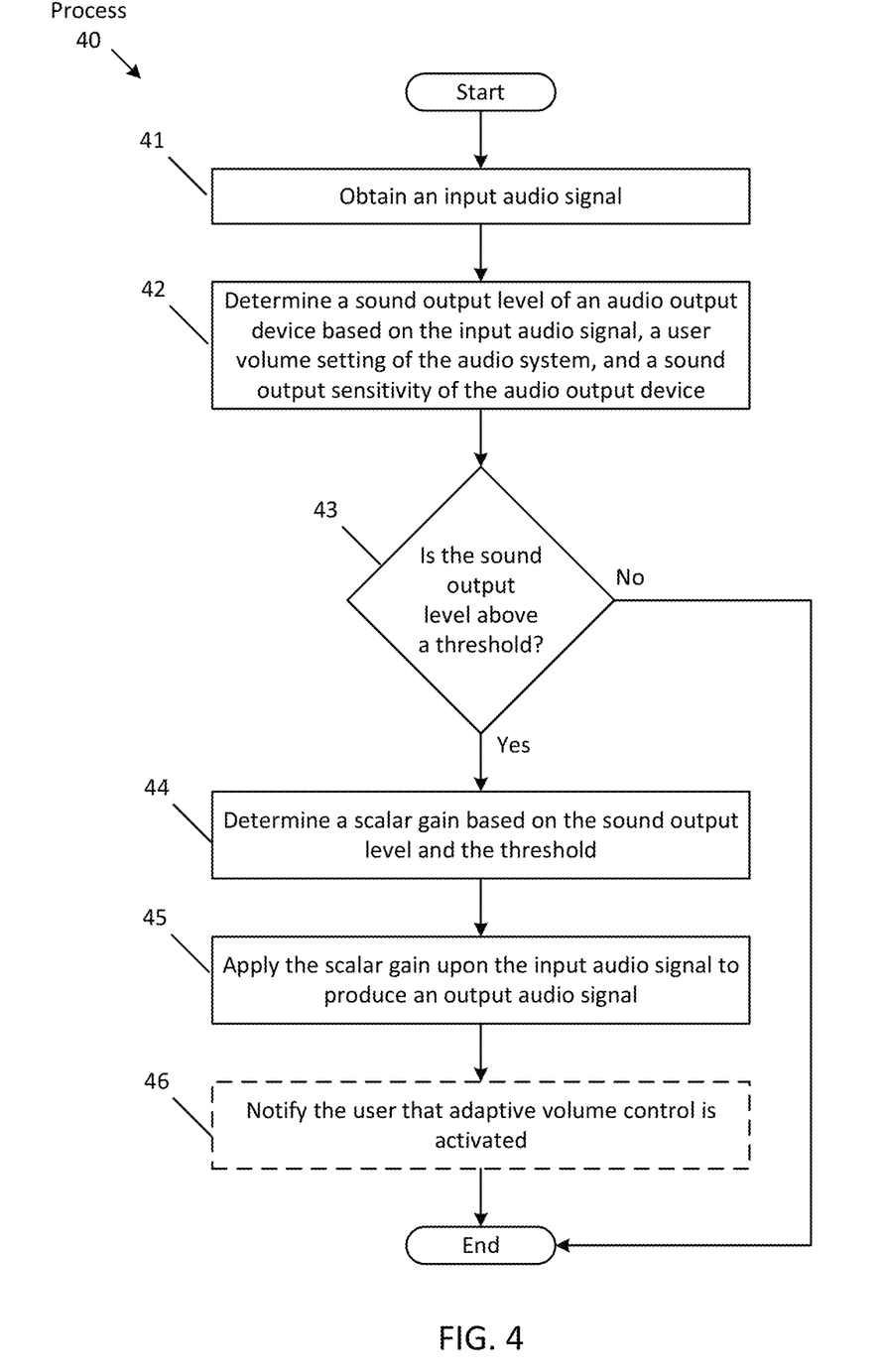
FIG. 4 is a flowchart of one aspect of a process to perform adaptive volume control.

FIG. 4 is a flowchart of one aspect of a process 40 to perform adaptive volume control. In one aspect, the process 40 is performed by (e.g., controller 21 of audio source device 2 and/or controller 30 of audio source device 30 of) the audio system 1. Thus, this figure will be described with reference to FIGS. 1-3. The process 40 begins by obtaining an input audio signal (at block 41). For instance, the audio source device 2 may obtain the input audio signal from the input audio source 20. The process 40 determines a sound output level of an audio output device based on the (obtained) input audio signal, a user volume setting of the audio system, and a sound output sensitivity of the output device (at block 42). In particular, the estimator 26 determines a SPL estimate based on at least one of the criteria described herein. The process 40 determines whether the sound output level is above a threshold (at decision block 43). As described herein, the threshold may be a user-defined threshold (e.g., based on parental controls), or a predefined threshold. If so, the process 40 determines a scalar gain (gain value) based on the sound output level and the threshold (at block 44). Specifically, the gain compute may determine the gain value based on the different between the sound output level and the threshold. For instance, if the sound output level is 3 dB higher than the threshold, the gain value may be −3 dB. The process 40 applies the gain value upon the input audio signal to produce an output audio signal (at block 45). For instance, the scalar gain 28 may apply a gain value upon the gain-adjusted audio signal in response to the SPL estimating being at or above the threshold. The process 40 notifies the user that adaptive volume control is activated (at block 46). For instance, the audio system may output a notification that the adaptive volume control is actively reducing the volume of sound output. As an example, the audio system 1 may output an alert audio via a speaker (e.g., speaker 22) as "Volume has been reduced.". Specifically, the audio source device may transmit the alert audio as an audio signal to the audio output device 5 to drive the speaker 22. As another example, the audio source device output by notification by displaying (e.g., on a display screen of the device) a visual message alerting the user of the volume reduction.

Some aspects perform variations of the process 40 described in FIG. 4. For example, the specific operations of at least some of the processes may not be performed in the exact order shown and described. The specific operations may not be performed in one continuous series of operations and different specific operations may be performed in different aspects. For instance, as described herein, the operations performed by block 46 may be optionally performed.

As described herein, the audio system 1 may perform at least some of the operations described in FIGS. 2-4 based on certain criteria. In one aspect, the audio system may perform at least some of the operations based on whether the audio output device is a non-powered or powered device. For example, the audio system 1 may perform the operations of FIG. 2 when the audio output device is a non-powered device, and may perform the operations of FIG. 3 when the audio output device is a powered device.

Figure 5:
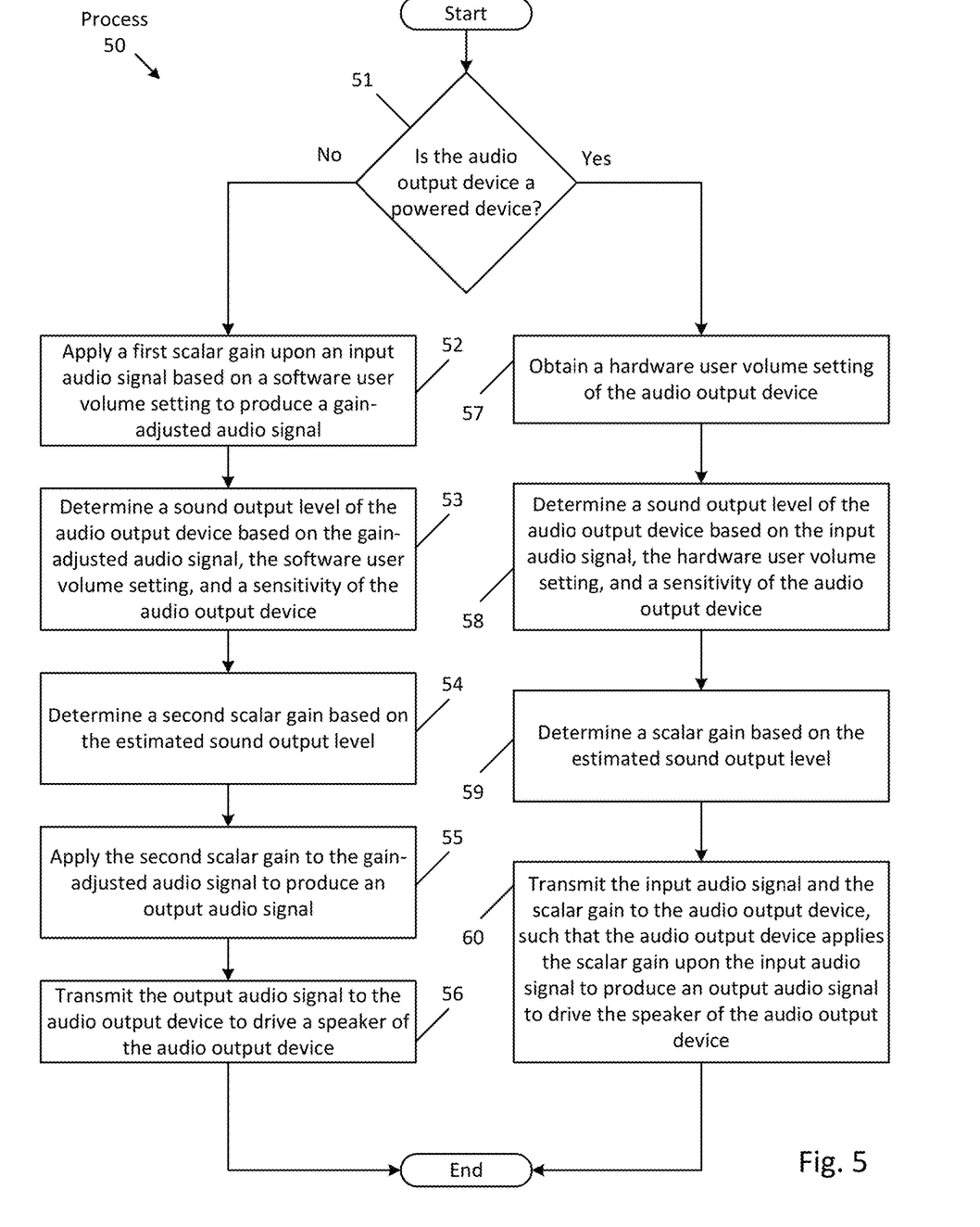
FIG. 5 is a flowchart of one aspect of a process to perform different adaptive volume control based on whether the audio output device is a powered device.

FIG. 5 is a flowchart of one aspect of a process 50 to perform different adaptive volume control based on whether the audio output device is a powered device. In one aspect, the process 50 is performed by the audio source device 2 (and/or the audio output device, such as device 6) of the audio system 1, as described herein. Thus, this figure will be described with reference to FIGS. 1-3. The process begins by determining whether the audio output device is a powered device (at decision block 51). As described herein, the audio system 1 may make this determination based on communication between the source device 2 and the output device. For example, the output device may transmit a message (e.g., as one or more data packets via a wired or wireless connection), which indicates whether the device is powered or not. For instance, an indication of whether the output device is a powered device may be a response (or transmission) indicating device data (e.g., a sensitivity) and/or a unique identifier, as described herein.

If not, the process 50 applies a first scalar gain upon an input audio signal based on a software user volume setting to produce a gain-adjusted audio signal (at block 52). For instance, the scalar gain 23 may apply a first scalar gain upon the input audio signal based on the user volume setting 24. The process 50 estimates a sound output level of the audio output device based on the gain-adjusted audio signal, the software user volume setting, and a sensitivity of the audio output device (at block 53). As described herein, the sound output level estimator 26 estimates the SPL based on at least one of these criteria. The process 50 determines a second scalar gain based on the estimated sound output level (at block 54). In one aspect, the gain compute 27 may determine the second scalar gain based on the estimated sound output level and a threshold, as described herein. The process 40 applies the second scalar gain to the gain-adjusted audio signal to produce an output audio signal (at block 55). The process 50 transmits the output audio signal to the audio output device to drive a speaker of the audio output device (at block 56). In one aspect, the operations performed by blocks 52-56 may be performed by the audio source device 2, as described with reference to FIG. 2.

If, however, the audio output device is a powered device the process 50 obtains a hardware user volume setting from (e.g., set by a volume control by) the audio output device (at block 57). The process 50 estimates a sound output level of the audio output device based on the input audio signal, the hardware user volume setting, and a sensitivity of the audio output device (at block 58). The process 50 determines a scaler gain based on the estimated sound output level (at block 59). The process 50 transmits the input audio signal and the scaler gain to the audio output device, such that the audio output device applies the scalar gain upon the input audio signal to produce an output audio signal to drive the speaker of the audio output device (at block 60). In one aspect, the operations performed by blocks 56-60 may be performed by the audio source device 2, as described with reference to FIG. 3.

Some aspects perform variations of the process 50 described in FIG. 5. For example, the specific operations of at least some of the processes may not be performed in the exact order shown and described. The specific operations may not be performed in one continuous series of operations and different specific operations may be performed in different aspects. In one aspect, the audio system 1 may perform the operations of blocks 52-56 (as opposed to blocks 57-60) based on certain conditions. For example, the audio system may perform such operations based on user (or system settings). For instance, the system may perform the operations of blocks 52-56 by default, meaning upon determining that the source device and the output device are paired the system may perform these operations until the system determines that the output device is a powered device (e.g., based on communication between both devices. In another aspect, the system may perform these operations, regardless of whether or not the output device is a powered device (e.g., based on the system settings). Thus, at decision block 51 the system may proceed to block 52 upon determining that the settings indicate to perform these operations.

In one aspect, at least some of the operations of process 40 and/or process 50 of FIGS. 4 and 5 may be performed by a machine learning algorithm that is configured to estimate the sound output level and adapt volume control according to the estimated level in order to ensure that the output of the speaker of the output device does not exceed a threshold. In another aspect, the machine learning algorithm may include one or more neural networks (e.g., convolution neural networks, recurrent neural networks, etc.) that are configured to perform the operations described herein.

In one aspect, at least some of the operations described herein are operational operations that may or may not be performed. Specifically, blocks that are illustrated as having dashed or dotted boundaries may optionally be performed. For instance, block 52 may be operational since the audio signal obtained by the adaptive volume control 25 may already be gain-adjusted. In another aspect, other operations described in relation to other blocks may be optional as well.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations, signal processing operations, audio signal processing operations, and adaptive volume control operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an audio source device that is communicatively coupled to a headset, the method comprising:
   obtaining an input audio signal;
   determining a sound output level of the headset using the input audio signal and a user volume setting;
   determining whether the sound output level is above a threshold;
   in response to determining that the sound output level is above the threshold, determining a scalar gain to be applied upon the input audio signal to produce an output audio signal;

determining whether the headset is capable of volume adjustments through a hardware volume setting;

responsive to determining that the headset is not capable of volume adjustments through the hardware volume setting, applying the scalar gain upon the input audio signal to produce the output audio signal on the audio source device; and responsive to determining that the headset is capable of volume adjustments through the hardware volume setting, transmitting the scalar gain and the input audio signal to the headset for the headset to produce the output audio signal.

2. The method of claim 1, wherein the scalar gain is a first scalar gain and the user volume setting is a software user volume setting, wherein the method further comprises, responsive to determining that the headset is not capable of volume adjustments through the hardware volume setting, applying a second scalar gain according to the software user volume setting upon the input audio signal to produce a gain-adjusted input audio signal, wherein the sound output level is based on the gain-adjusted audio signal.

3. The method of claim 2 further comprises applying the first scalar gain upon the gain-adjusted audio signal to produce the output audio signal.

4. The method of claim 2, wherein the first scalar gain is determined based on the sound output level and the threshold.

5. The method of claim 1, wherein the sound output level is an output A-weighted sound pressure level (SPL) of a speaker of the headset.

6. The method of claim 1 further comprising retrieving a sound output sensitivity of a speaker of the headset from memory of the audio source device, wherein the sound output level is determined using the sound output sensitivity.

7. The method of claim 1 further comprising, responsive to determining that 1) the sound output level is above the threshold and 2) the headset is not capable of volume adjustments through the hardware volume setting, applying the scalar gain to the input audio signal; and
outputting a notification indicating that a volume of sound output has been reduced.

8. The method of claim 1 further comprising, responsive to determining that the headset is capable of volume adjustments through the hardware volume setting, obtaining, from the headset, the user volume setting as the hardware volume setting by a volume control of the headset.

9. An audio source device comprising:
a processor; and
a memory having stored therein instructions which when executed by the processor causes the audio source device to
obtain an input audio signal;
determine a sound output level of a speaker of an audio output device with which the audio source device is communicatively coupled by using the input audio signal and a user volume setting;
determine whether the sound output level is above a threshold;
in response to determining that the sound output level is above the threshold, determine a scalar gain to be applied upon the input audio signal to produce an output audio signal;
determine whether the audio output device is capable of volume adjustments through a hardware volume setting;
responsive to determining that the audio output device is not capable of volume adjustments through the hardware volume setting, apply the scalar gain upon the input audio signal to produce the output audio signal on the audio source device; and
responsive to determining that the audio output device is capable of volume adjustments through the hardware volume setting, transmit the scalar gain and the input audio signal to the audio output device.

10. The audio source device of claim 9, wherein the scalar gain is a first scalar gain and the user volume setting is a software user volume setting, wherein the memory has further instructions to, responsive to determining that the audio output device is not capable of volume adjustments through the hardware volume setting, apply a second scalar gain according to the software user volume setting upon the input audio signal to produce a gain-adjusted input audio signal, wherein the sound output level is based on the gain-adjusted audio signal.

11. The audio source device of claim 10, wherein the memory has further instructions to apply first scalar gain upon the gain-adjusted audio signal to produce the output audio signal.

12. The audio source device of claim 11, wherein the first scalar gain is determined based on the sound output level and the threshold.

13. The audio source device of claim 9, wherein the sound output level of the speaker is determined using a sound output sensitivity of the speaker, wherein the sound output sensitivity is one of a predefined sensitivity that is associated with the audio output device or a default sensitivity.

14. The audio source device of claim 9, wherein the memory has further instructions to, responsive to determining that 1) the sound output level is above the threshold and 2) the audio output device is not capable of volume adjustments through the hardware volume setting, apply the scalar gain to the input audio signal; and
output a notification indicating that a volume of sound output has been reduced.

15. The audio source device of claim 9, wherein the memory has further instructions to, responsive to determining that the audio output device is capable of volume adjustments through the hardware volume setting, obtain, from the audio output device, the user volume setting as the hardware volume setting by a volume control of the audio output device.

16. A method performed by a programmed processor of an audio source device, the method comprising:
obtaining an input audio signal;
determining a sound output level of an audio output device using the input audio signal and a user volume setting;
determining a scalar gain based on the sound output level;
determining whether the audio output device is capable of volume adjustments through a hardware volume setting; and
responsive to determining that the audio output device is capable of volume adjustments through the hardware volume setting,
obtaining the user volume setting as a hardware user volume setting by a volume control of the audio output device, and
transmitting the scalar gain and the input audio signal to the audio output device.

17. The method of claim 16, wherein the scalar gain is a first scalar gain and the user volume setting is a software user volume setting, wherein the method further comprises, responsive to determining that the audio output device is not capable of volume adjustments through the hardware volume setting, applying a second scalar gain according to the software user volume setting upon the input audio signal to produce a gain-adjusted input audio signal, wherein the sound output level is based on the gain-adjusted audio signal.

18. The method of claim 17 further comprising applying the first scalar gain to the gain-adjusted input audio signal to produce an output audio signal for transmission to and output by the audio output device.

19. The method of claim 16 further comprising, responsive to determining that the audio output device is not capable of volume adjustments through the hardware volume setting, applying the scalar gain upon the input audio signal to produce an output audio signal on the audio source device.

20. The method of claim 19 further comprising transmitting the output audio signal to the audio output device to drive a speaker of the audio output device.

\* \* \* \* \*